US012674953B2

(12) United States Patent     (10) Patent No.:   US 12,674,953 B2

Moehrle et al.     (45) Date of Patent:    Jul. 7, 2026

(54) IMAGER MODULE FOR A CAMERA OR A SENSOR

(71) Applicant: Robert Bosch GmbH, Stuttgart (DE)

(72) Inventors: Andreas Moehrle, Stuttgart (DE); Moritz Winkler, Waldbronn (DE); Nikolai Bauer, Moeglingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 118 days.

(21) Appl. No.: 18/556,182

(22) PCT Filed: Aug. 2, 2022

(86) PCT No.: PCT/EP2022/071668

§ 371 (c)(1),
(2) Date: Oct. 19, 2023

(87) PCT Pub. No.: WO2023/041244

PCT Pub. Date: Mar. 23, 2023

(65) Prior Publication Data

US 2024/0369798 A1     Nov. 7, 2024

(30) Foreign Application Priority Data

Sep. 17, 2021    (DE) ..................... 10 2021 210 306.5

(51) Int. Cl.
   *G02B 7/02*       (2021.01)
   *G02B 27/00*      (2006.01)
         (Continued)

(52) U.S. Cl.
   CPC ........... *G02B 7/02* (2013.01); *G02B 27/0006* (2013.01); *H04N 23/51* (2023.01); *H04N 23/54* (2023.01)

(58) Field of Classification Search
   CPC ...... G02B 27/0006; G02B 7/02; G03B 17/12; G03B 17/55; G03B 2217/002;
      (Continued)

(56) References Cited

U.S. PATENT DOCUMENTS 11,635,672 B2 *   4/2023   Sesti ...................... G03B 17/12
                                396/529
2018/0033807 A1   2/2018   Matsuda et al.
                (Continued)

FOREIGN PATENT DOCUMENTS

DE        10352969 B4    12/2005
DE    102019200061 A1    7/2020
               (Continued)

OTHER PUBLICATIONS

International Search Report for PCT/EP2022/071668, Issued Nov. 3, 2022.

*Primary Examiner* — Amy R Hsu
(74) *Attorney, Agent, or Firm* — NORTON ROSE FULBRIGHT US LLP

(57) ABSTRACT

An imager module for a camera or a sensor. The imager module includes a housing, a sensor carrier which is fixedly connected to the housing and on which an imaging sensor is arranged, a lens, and a holding member using which the lens is held in place and is oriented relative to the imaging sensor. The holding member has a flat portion, which is eccentric in relation to the lens, and a flange portion which is arranged at an angle thereto, surrounds the lens only over a partial circumferential region, and is welded to the lens.

14 Claims, 6 Drawing Sheets

(51) Int. Cl.
    *H04N 23/51*        (2023.01)
    *H04N 23/54*        (2023.01)

(58) Field of Classification Search
    CPC ........ H04N 23/51; H04N 23/52; H04N 23/54;
                            H04N 23/55; H04N 23/57
    See application file for complete search history.

(56)                  References Cited

U.S. PATENT DOCUMENTS

| | | |
|---|---|---|
| 2019/0052782 A1 | 2/2019 | Sung et al. |
| 2019/0250363 A1 | 8/2019 | Ha et al. |
| 2021/0072621 A1* | 3/2021 | Faridian ................. G03B 17/12 |
| 2021/0173175 A1* | 6/2021 | Itagaki ................. G02B 27/646 |
| 2021/0180642 A1* | 6/2021 | Botkus ..................... F16B 1/00 |

FOREIGN PATENT DOCUMENTS

| | | |
|---|---|---|
| DE | 102020203081 A1 | 11/2020 |
| DE | 102019213798 A1 | 3/2021 |
| DE | 102019216283 A1 | 4/2021 |
| DE | 102019216287 A1 | 4/2021 |
| JP | 2012114675 A | 6/2012 |
| JP | 2020537768 A | 12/2020 |
| WO | 2018054426 A1 | 3/2018 |
| WO | 2019225745 A1 | 11/2019 |

* cited by examiner

IMAGER MODULE FOR A CAMERA OR A SENSOR

FIELD

The present invention relates to an imager module for a camera or sensor.

Preferred applications for the camera or sensor are video-based driver assistance systems, industrial and/or security camera applications, and consumer products, such as smartphones and tablets.

BACKGROUND INFORMATION

An imager module for a camera or sensor typically comprises an imaging sensor arranged on a sensor carrier, and a lens having at least one optical lens element. Since an axial distance between the lens and the imaging sensor must be bridged and the lens must be oriented relative to the imaging sensor, a holding device can be provided between the lens and the imaging sensor, which holding device is adhered to both the lens and to the sensor carrier to fix the focused position.

Such an arrangement is exemplified in German Patent Application No. DE 10 2019 200 061 A1, which describes an image capture device having a lens member assembly. The lens member assembly has a tube with at least one lens element received therein, wherein the tube is received in a holding device of the image capture device, which holding device has a first holding adhesive region for adhesion to a sensor carrier and a second holding adhesive region for adhesion to the tube.

However, adhesive connections have the disadvantage that they tend to swell under the influence of temperature and/or humidity, such that the set focus position is jeopardized. Furthermore, adhesives change their properties due to aging. This can also result in defocusing due to a changing axial distance between the lens and the imaging sensor.

An object of the present invention is that of specifying an imager module for a camera or sensor that has the most stable focus position possible, even under the influence of temperature and/or humidity. In addition, the imager module should be as simple as possible and thus inexpensive to manufacture.

In order to achieve the object, an imager module having the features of the present invention is provided. Advantageous developments of the present invention are disclosed herein.

SUMMARY

An imager module for a camera or sensor, according to an example embodiment of the present invention, comprises a preferably multi-part housing, a sensor carrier which is fixedly connected to the housing and on which an imaging sensor is arranged, a lens, and a holding member. Via the holding member, the lens is held in place and is oriented relative to the imaging sensor. In this case, the holding member has a flat portion arranged eccentrically in relation to the lens, and a flange portion which is arranged at an angle thereto, surrounds the lens only over a partial circumferential region and is welded, preferably spot-welded, to the lens.

In the imager module according to an example embodiment of the present invention, the typically provided adhesive connection between the lens and the lens holder or the holding member is thus replaced by a welded connection. In contrast to an adhesive connection, a stable focus position can be achieved with the aid of the welded connection, even under the influence of temperature and/or humidity. Accordingly, a robust connection between the lens and the holding member is achieved with the aid of the welded connection.

The welded connection also has advantages in the assembly of the imager module. This is because, prior to welding, the lens can be oriented relative to the imaging sensor and subsequently fixed by setting the welding seam. Welding seams are preferably only set at spots, such that the heat input during welding is minimal.

According to an example embodiment of the present invention, the welded connection is preferably produced with the aid of a laser, such that this is a laser-welded connection. With the aid of the laser, individual welding spots can be set in a targeted manner.

According to a preferred embodiment of the present invention, the flat portion of the holding member is welded, preferably spot-welded, to the housing and/or to the sensor carrier. Thus, the focus position of the lens is doubly fixed and thus particularly stable. This is particularly true since an adhesive connection is dispensed with entirely, such that changes with regard to temperature and/or humidity have no effect on the focus position of the lens. The welded connection can also be produced here by means of a laser. Preferably, only spot welding seams or welding points are set, in order to minimize heat input.

According to an example embodiment of the present invention, preferably, the holding member is made of metal. This ensures the weldability of the holding member. Furthermore, the holding member is preferably made of a metal sheet, since this enables the holding member to be manufactured as a stamped/bent part at particularly low cost.

Furthermore, it is provided according to an example embodiment of the present invention that the lens has a metal contour at least in the region of the flange portion of the holding member for welding to the holding member. This means that the lens is made of metal at least in a partial circumferential region. This is the partial circumferential region surrounded by the flange portion of the holding member. Depending on the design of the holding member, in particular the flange portion, the partial circumferential region can extend over more or less than 180°. If only a flange portion is provided, this preferably extends over a partial circumferential region of the lens of at least 180°, such that a robust connection between the lens and the holding member is ensured by setting at least three welding points. Instead of one continuous flange portion, a plurality of short flange portions can be provided, which are then welded to the lens. For example, three short flange portions, two of which face one another at the lens, can be provided.

It is further provided according to an example embodiment of the present invention that the housing is at least partially made of metal. This enables a welded connection between the holding member and the housing. Furthermore, a metal housing has a particularly high level of robustness, such that the components received therein are particularly well protected against external influences.

The sensor carrier on which the imaging sensor is arranged can in particular be a printed circuit board. The imaging sensor can then be electrically contacted via conductor tracks arranged on the circuit board.

In a further development of the present invention, it is provided that the sensor carrier is connected to the housing in a positive-locking manner. The position of the sensor carrier and thus of the imaging sensor arranged on it can be fixed in relation to the housing via the positive-locking fit. The positive-locking fit can be produced, for example, with the aid of at least one housing-side geometry which engages in a recess in the sensor carrier. Preferably, at least two, for example three or four such geometries are provided, which are further preferably arranged in a spatially distributed manner. In this case, the geometries can be used at the same time to connect the housing to the holding member. For example, the geometries can form bases for mounting the holding member. In the region of the geometries, the holding member can then be welded to the housing.

Advantageously, according to an example embodiment of the present invention, the housing comprises at least a first housing part for connection to the sensor carrier, and a second housing part designed as a cover. The multi-part design of the housing facilitates the assembly of the imager module. This is because the sensor carrier, including the imaging sensor, can initially be inserted into the housing and connected to it. Subsequently, the holding member and the lens are assembled, wherein the lens is oriented relative to the imaging sensor. After the focus position has been fixed, the second housing part, designed as a cover, can be mounted such that the housing is closed and the components received therein are optimally protected.

According to an example embodiment of the present invention, the first and the second housing part are preferably connected in an integrally bonded or positive-locking manner. For example, the contact region can have a stepped profile over which the two housing parts interlock. As an alternative or addition, the two housing parts can be adhered together. Both measures-alone and in combination-prevent dirt from getting into the housing. The integrally bonded connection by means of the adhering also provides a seal for the housing in the connection region.

According to an example embodiment of the present invention, the second housing part designed as a cover preferably has a recess through which the lens is passed. This ensures that the optics accommodated in the lens are not covered by the second housing part. Advantageously, a seal is inserted in an annular gap between the housing part and the lens to seal the housing. The seal can be received in a circumferential annular groove of the lens, such that it is assembled together with the lens. The seal being received in the annular groove prevents it from being displaced upon the assembly of the second housing part, which is designed as a cover. More preferably, the recess of the second housing part is enclosed by a collar that comes into contact with the seal upon assembly of the second housing part. In this way, the sealing of the housing can be further optimized.

According to an example embodiment of the present invention, the lens preferably has at least one optical lens element, which forms the optics. A plurality of optical lens elements can be combined, for example, in the form of a lens element package.

This can be pre-assembled and inserted into the lens as a unit, such that assembly is further simplified.

Furthermore, it is provided according to an example embodiment of the present invention that an electrical consumer, for example a heating device, is integrated into the lens and the electrical contacting is realized in an outer circumferential region of the lens, which region is released by the eccentrically arranged holding member. Thus, the provided eccentric arrangement of the holding member has several advantages. A first advantage is that material and costs can be saved. In addition, the holding member leaves free spaces that facilitate the necessary electrical contacting. This can be produced with the aid of conductor tracks, cables and/or pins. There is sufficient space to receive such elements due to the eccentric arrangement of the holding member.

Preferred embodiments of the present invention are described in more detail below with reference to the figures.

DETAILED DESCRIPTION OF EXAMPLE EMBODIMENTS

Figure 1:
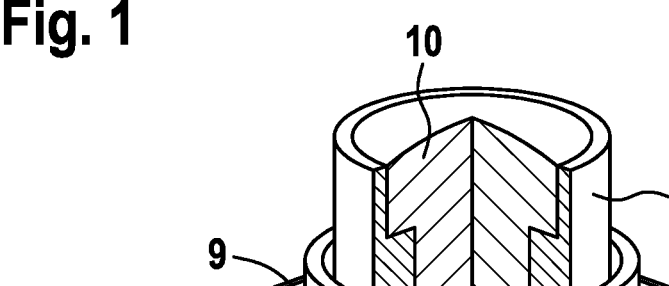
FIG. 1 shows a cutaway perspective view of an imager module according to a first preferred example embodiment of the present invention.

FIG. 1 shows a first preferred embodiment of an imager module 1 according to the present invention. This comprises a housing 2 having a first housing part 2.1 and a second housing part 2.2. A sensor carrier 3 with an imaging sensor 4 arranged thereon is inserted into the first housing part 2.1. Above the imaging sensor 4, a lens 5 comprising at least one lens element 10, preferably in the form of a lens element package, is arranged and oriented relative to the imaging sensor 4. The lens 5 is held in place and fixed by a holding member 6. The second housing part 2.2 is arranged above the holding member 6, wherein the lens 5 is guided through a recess 7 of the housing part 2.2.

Figure 2:
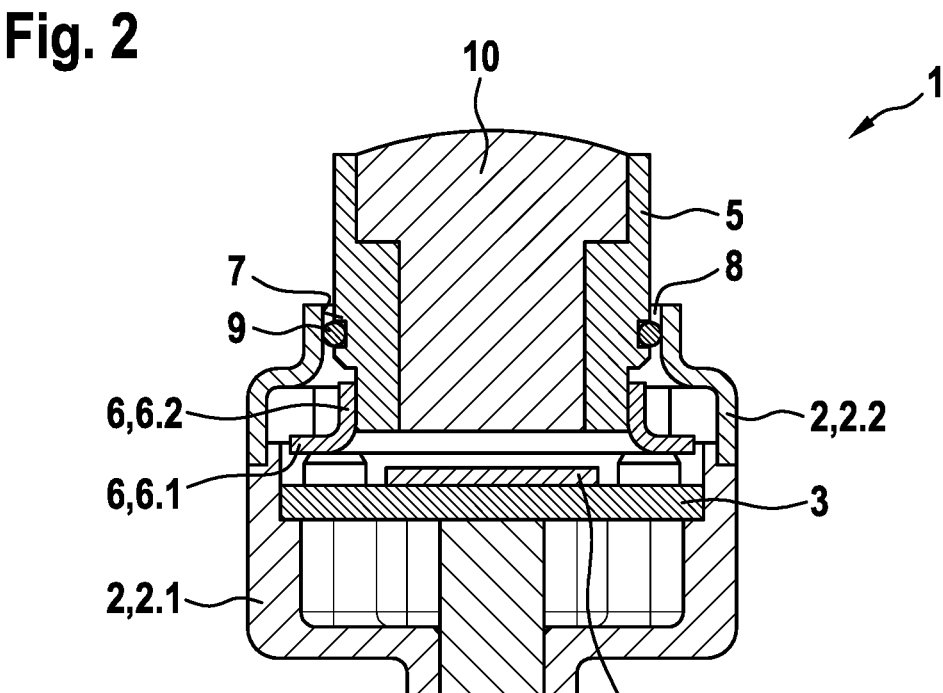
FIG. 2 shows a longitudinal section through the imager module of FIG. 1.
Figure 3:
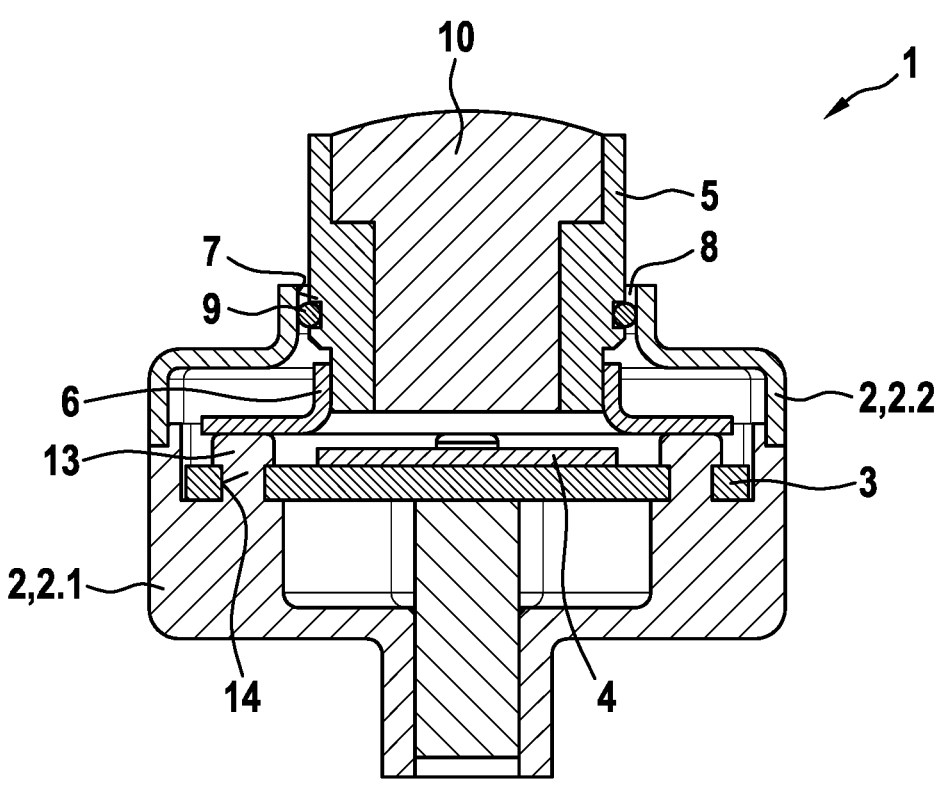
FIG. 3 shows another longitudinal section through the imager module of FIG. 1, but rotated by 90°.

As can be seen in particular from FIGS. 2 and 3, a seal 9 is inserted in an annular gap 8 between the lens 5 and the housing part 2.2, such that the housing 2 is sealed from the outside.

FIGS. 2 and 3 further show that the holding member 6 is arranged eccentrically in relation to the lens 5, such that the holding member 6 surrounds the lens 5 only partially or over a partial circumferential region. The holding member 6 also has a flat portion 6.1 and a flange portion 6.2, which is arranged at an angle, in this case at a right angle, in relation to the flat portion 6.1. Thus, the flange portion 6.2 can be used to connect the holding member 6 to the lens 5 in a simple manner.

Figure 4A:
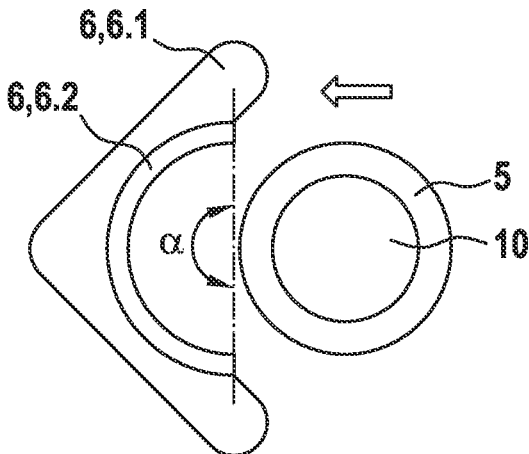
FIGS. 4A and 4B show a top view of the lens and the holding device of the imager module of FIG. 1, prior to assembly (FIG. 4A), and after assembly (FIG. 4B).
Figure 4B:
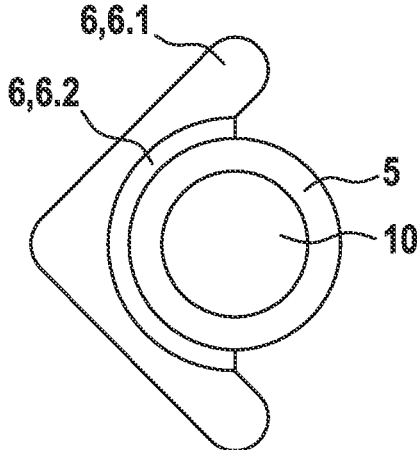

FIGS. 4A and 4B show that the flange portion 6.2 extends over a partial circumferential region that, in the present case, corresponds to an angle $\alpha$ of 180°. However, the angle $\alpha$ can be freely selected. Instead of a single flange portion 6.2, a plurality of shorter flange portions 6.2 can also be provided, analogous to the further embodiment of an imager module 1 according to the present invention shown in FIGS. 9 and 10.

Figure 5:
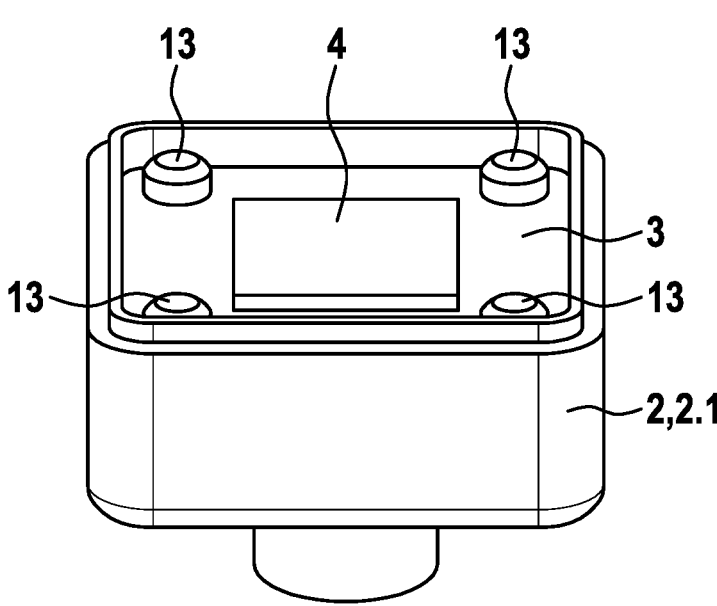
FIG. 5 shows a perspective view of the housing of the imager module of FIG. 1 with an inserted sensor carrier and imaging sensor.

In particular, it can be seen from FIG. 3 that the holding member 6 is mounted on housing-side geometries 13 in the form of bases. These are inserted in recesses 14 of the sensor carrier 3 and project above the sensor carrier 3. In this way, a positive-locking fit is achieved between the sensor carrier 3 and the housing 2. As shown by way of example in FIG. 5, a total of four of these geometries 13 can be provided, onto which the sensor carrier 3 is placed from above during assembly. The holding member 6 can then be placed on the geometries 13.

Figure 6:
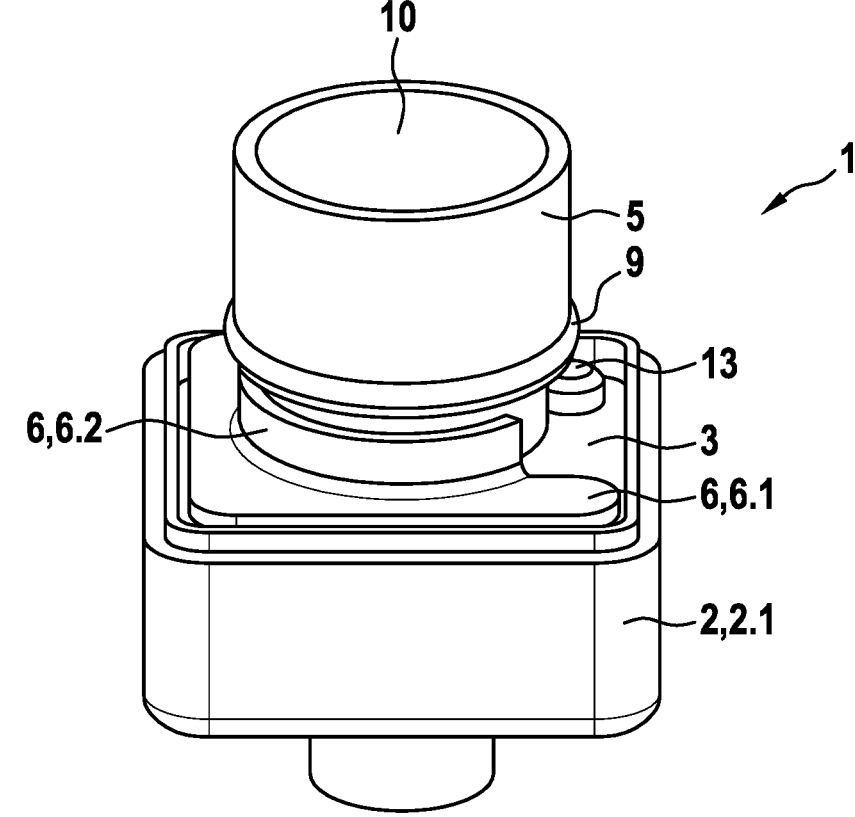
FIG. 6 shows a perspective view of the housing of FIG. 5 after insertion of the holding member and the lens.

Subsequently, the lens 5 can be placed above the imaging sensor 4, oriented relative to the imaging sensor 4 and welded to the holding member 6 for long fixation, such that the arrangement shown by way of example in FIG. 6 is obtained.

Figures 7, 8:
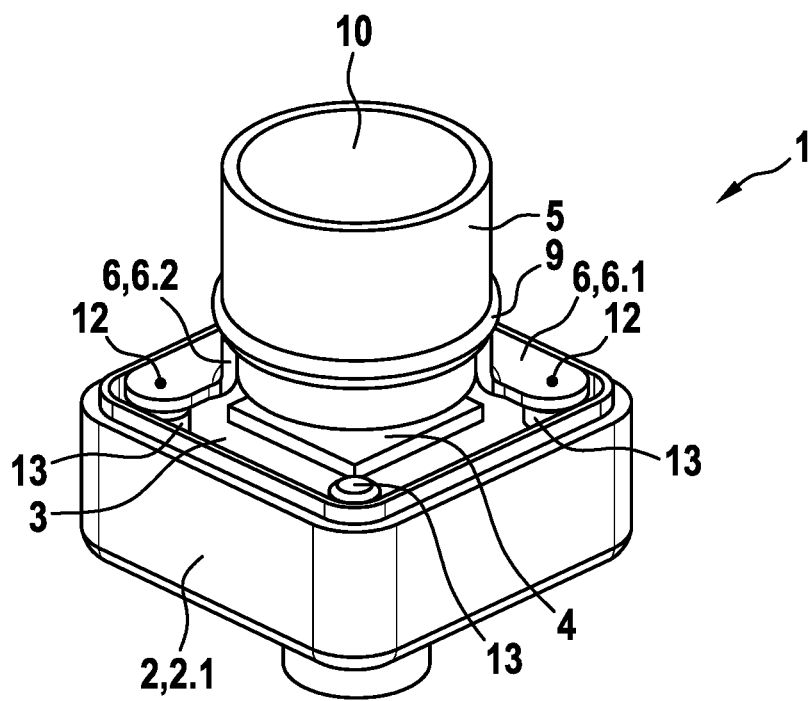
FIG. 7 shows the housing of FIG. 6, but rotated by 45° and with the welding spots indicated.
FIG. 8 shows the housing of FIG. 7, but once again rotated by 180°.

Preferably, the connection of the holding member 6 to the lens 5 and to the housing 2 is made via individual welding points 12, which can be set according to FIGS. 7 and 8. Three welding points 12, two of which are arranged opposite one another, are sufficient to produce a robust connection.

Figure 9:
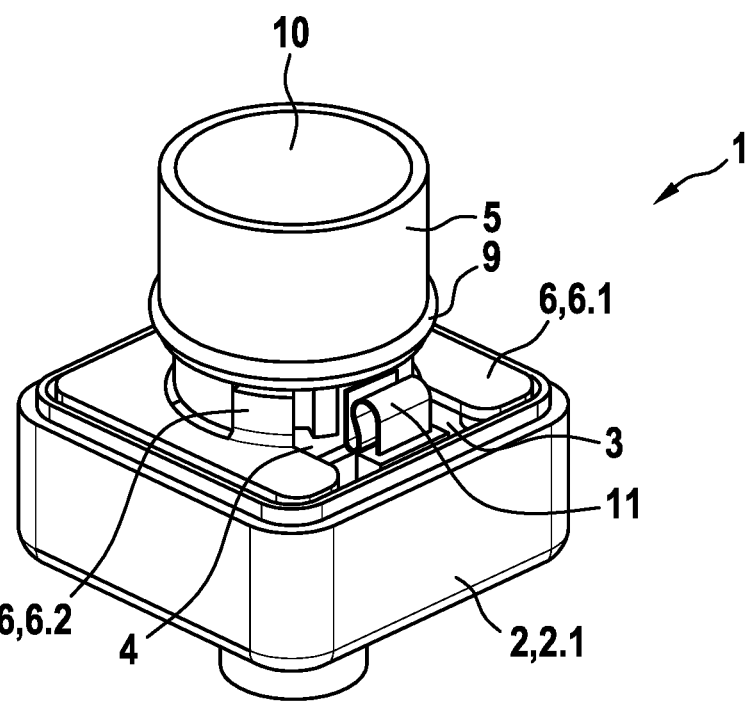
FIG. 9 shows a perspective view of an imager module according to a further preferred example embodiment of the present invention (without a cover part).
Figure 10:
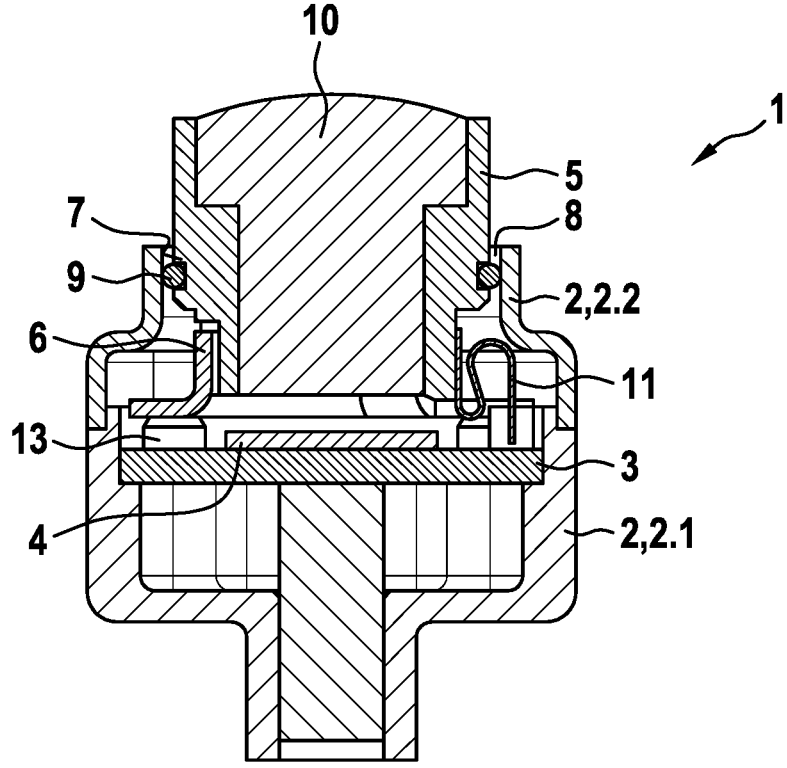
FIG. 10 shows a longitudinal section through the imager module of FIG. 9, but with a cover part.

The free space given by the eccentric arrangement of the holding member 6 can be used, as shown by way of example in FIGS. 9 and 10, to realize the electrical contacting 11 of an electrical consumer (not shown) integrated in the lens 5. Although the flat portion 6.1 of the holding member 6 shown in FIGS. 9 and 10 is significantly larger than in the holding member 6 of FIGS. 1 to 8, there is still sufficient free space to receive contact means.

The invention claimed is:

1. An imager module for a camera or a sensor, comprising:
a housing;
a sensor carrier which is fixedly connected to the housing and on which an imaging sensor is arranged;
a lens; and
a holding member which holds the lens in place and is oriented relative to the imaging sensor, wherein the holding member has a flat portion which is arranged eccentrically in relation to the lens, and a flange portion which is arranged at an angle to the flat portion, surrounds the lens only over a partial circumferential region and is welded to the lens,
wherein the housing includes a first housing part receiving the sensor carrier and a second housing part designed as a cover, the first and second housing parts being connected in a positive-locking manner, and the sensor carrier being engaged with at least one housing-side geometry in a positive-locking manner.

2. The imager module according to claim 1, wherein the housing is a multi-part housing.

3. The imager module according to claim 1, wherein the flange portion is spot-welded to the lens.

4. The imager module according to claim 1, wherein the flat portion of the holding member is welded to the housing and/or to the sensor carrier.

5. The imager module according to claim 1, wherein the holding member is made of metal.

6. The imager module according to claim 1, wherein the holding member is made of a metal sheet.

7. The imager module according to claim 1, wherein the lens has a metal contour at least in a region of the flange portion for welding to the holding member.

8. The imager module according to claim 1, wherein the housing is at least partially made of metal.

9. The imager module according to claim 1, wherein the sensor carrier is a printed circuit board and/or is connected to the housing in a positive-locking manner.

10. The imager module according to claim 1, wherein the housing includes at least a first housing part for connection to the sensor carrier and a second housing part configured designed as a cover, wherein the first housing part and the second housing part are connected in an integrally bonded and/or positive-locking manner.

11. The imager module according to claim 10, wherein the second housing part configured as a cover has a recess through which the lens is passed, and wherein a seal is inserted in an annular gap between the housing part and the lens.

12. The imager module according to claim 1, wherein the lens has at least one optical lens element.

13. An imager module for a camera or a sensor, comprising:
a housing;
a sensor carrier which is fixedly connected to the housing and on which an imaging sensor is arranged;
a lens; and
a holding member which holds the lens in place and is oriented relative to the imaging sensor, wherein the holding member has a flat portion which is arranged eccentrically in relation to the lens, and a flange portion which is arranged at an angle to the flat portion, surrounds the lens only over a partial circumferential region and is welded to the lens,
wherein an electrical consumer is integrated into the lens, and electrical contacting is realized in an outer circumferential region of the lens, the outer circumferential region being released by the eccentrically arranged holding member,
wherein the housing includes a first housing part receiving the sensor carrier and a second housing part designed as a cover, the first and second housing parts being connected in a positive-locking manner, and the sensor carrier being engaged with at least one housing-side geometry in a positive-locking manner.

14. The imager module according to claim 13, wherein the electrical consumer is a heating device.

* * * * *